No. 657,975. Patented Sept. 18, 1900.
C. WITTKOWSKY.
PROCESS OF MANUFACTURING ARTICLES FROM VENEERS.
(Application filed Mar. 17, 1898.)
(No Model.)

Witnesses:
Paul Wollenberg
Emil Kayser

Inventor
Carl Wittkowsky
by Robert Heigler
Attorney

UNITED STATES PATENT OFFICE.

CARL WITTKOWSKY, OF BERLIN, GERMANY.

PROCESS OF MANUFACTURING ARTICLES FROM VENEERS.

SPECIFICATION forming part of Letters Patent No. 657,975, dated September 18, 1900.

Application filed March 17, 1898. Serial No. 674,251. (No model.)

*To all whom it may concern:*

Be it known that I, CARL WITTKOWSKY, a subject of the King of Prussia, German Emperor, and a resident of Berlin, Kingdom of Prussia, German Empire, have invented an Improved Method of Manufacturing Articles from Veneers, of which the following is an exact specification.

This invention relates to a process for the manufacture of objects of various shapes—such as trays, bowls, plates, boxes, traveling-trunks, and the like—from veneers having their direction of grain arranged crosswise above or to each other, and has for its object the production of these articles from wood veneers in a manner hitherto not attained.

It is a recognized fact that the manufacture of articles for domestic and other purposes from three or more ply veneers having their grain crosswise one to the other, the thickness of which exceeds one millimeter—as, for instance, plates, trays, buffet-boards, and the like having a raised flange or edge, and, further, for instance, boxes or trunks with rectangular bent edges, &c.—was hitherto an impossibility. Articles such as bowls, plates, trunks, boxes, and the like have therefore up to the present time either been turned out of a solid wood block possessing the required diameter, or merely straight boards have been employed upon which the required rims, flanges, ornamental edges, and the like have been produced either by screwing the said edge upon the article or by gluing the same, and in case of box-like bodies, the sides of which required to be rectangular to the bottom of the box, the said adjacent parts (in this case the sides) were simply either glued, dovetailed, nailed, or screwed, &c., to the said bottom.

Before proceeding with the description I will here state the required enumeration of the drawings, which for the better understanding of my invention I have caused to be annexed as a part of this specification.

Figure 1:
Figure 2:
Figure 3:
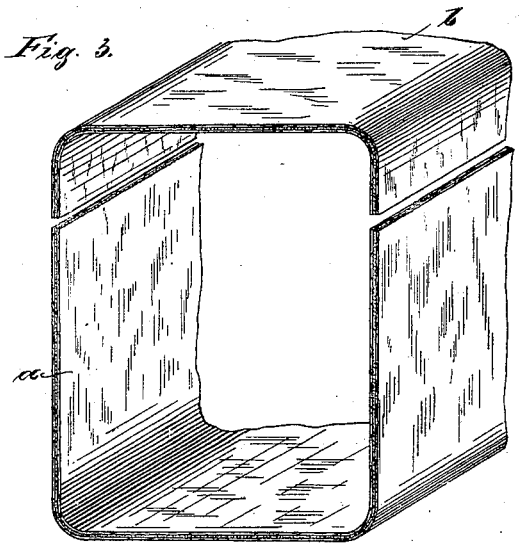

Figure 1 shows a bowl or the like in its finished form. Fig. 2 shows the said bowl in the form produced by the first bending process. Fig. 3 shows the body of a traveling trunk or box bent the second time.

Referring to the preamble of the specification, I remark that my experiments to produce from wood veneers a shaped article—
for instance, a bowl or the like, such as represented in Fig. 1—were commenced by placing the three or more ply veneers, the contact-surfaces of which were provided with a suitable binding substance or glue, in a mold in such manner that the grain was crosswise one above the other, said veneers being subsequently subjected to pressure in the shaped mold. As a result I regularly found that the veneers having a direction of grain parallel to the direction of bending did not bend at the edge, but were simply compressed and crushed by the said mold away from the bending edge, while the same veneer, having a cross-grain to the bending influence, it is true, held together in the direction of the grain, yet notwithstanding this small and short breaks or cracks occurred. My second series of experiments consisted in the employment upon the veneer of a binding substance which was allowed to partly dry upon the same, whereupon pressure and heat were applied. This experiment yielded a still less favorable result, as each separate veneer, as long as it was not connected with the other veneers, was found to break in proportion to its dryness. I therefore proceeded to produce the required bending in two operations by first uniting the three veneers and subjecting same to pressure in such manner that pressure applied in the first bending process caused the veneers to assume a shape which broadly indicated the result of the second bending operation. This first shape (or operation No. 1 or of the first bending process) is indicated by Fig. 2. It will be seen from this figure that no proper form is in reality imparted to the object, but simply a broad flange has been produced, which in general would correspond to the amount of bending which each separate veneer would admit of in a natural state when unconnected with any other veneer. My next operation was to take the article I had obtained by operation No. 1 (consisting or made up of three-ply veneers securely united, the shape of which was, however, as indicated, not yet complete) and subject the said article to a second application of pressure between molds shaped as shown in Fig. 1 in order to produce the intended bowl or the like without the outer or inner veneers showing a break. I conducted these operations upon the basis that if the veneers were once thoroughly united in a longitudinal and cross direction, the grains of one veneer are held by the grains of the veneers behind and crosswise to the same, and that in such case breaks could not take place; but also this experiment did not succeed, for even when using a binding substance which became soft by heat and pressure breaks occurred before the object was properly under the influence of the entire pressure and the full influence of the heat. The binding substance was therefore not sufficiently quickly softened, and therefore breaks were unavoidable. This result induced me to produce the necessary softness by uniting the veneers with a binding substance insoluble in water and placing the thus united veneer body in water subsequent to the first pressing to make same soft for the next pressing. The result was a very marked swelling of the outer surfaces, and, moreover, the largest portion of the water sucked up by the wood surfaces still remained in the wood, or, more precisely, in the article under treatment, even after the second pressing, so that the bowl or the like did not retain the form imparted by the second pressing, the same soon after the said second pressing returning to its previous shape. This was, however, one step forward, more especially as breaks of the outer veneers no longer took place. These experiences and experiments have, however, led to the discovery of the improved process forming the subject of this invention.

By means of the hereinafter-described process the problem above indicated has been solved in a satisfactory and successful manner.

In my improved process the article or object obtained by the first pressing operation is slightly dampened with water upon its outer and inner surfaces with a sponge or cloth and then subjected upon its upper surface to a steam-jet having a pressure of about two and one-half to three atmospheres. The result is such that during the short time in which the hot steam-jet plays upon the surface the water which the above-mentioned dampening of the surfaces had left upon the said surfaces is forced by the steam-jet into the pores of the wood, and thus caused to directly act upon the binding substance between the veneers, while the outer surfaces of the wood remained comparatively dry—i. e., the pores of the wood are thus not entirely saturated with the water. While the upper surfaces of the wood remain comparatively dry, the surfaces connected by the binding substance receive only as much moisture and heat above 100° as is necessary for the proper success or action of the second pressing operation. The wood and also the binding substance thus becomes soft or pliable, and the comparatively-small quantity of moisture imparted to the article under treatment disappears under the subsequent action of the heat and pressure of the second operation so quickly that although the wood and the binding material become pliable or flexible enough so as to take or receive at a pressure lasting from three to four minutes the complete form desired they soon, however, again assume or go back into the former stiff state, so that upon taking the article from the mold after the second pressing the article has no longer even a tendency to return to its former shape, the veneers retaining absolutely the shape given them by the second pressing without a break or split or without showing the slightest traces of the processes or treatment to which they have been subjected. Thus by means of my improved hereinbefore-described process I am now in a position not only to produce bowls, plates, trays, and articles of daily use of various and many kinds, said articles possessing a pressed profile, raised or ornamented edge, but, furthermore, I can also by the said process produce box-shaped bodies, as by means of the said process straight boards or plates can be bent to obtuse, rectangular, or acute angular boards having a direction of grain parallel to the sides of the angle. It is of course clear that the said boards forming the box or the like must not be bent at too sharp an angle, or, more precisely, must not receive a sharp edge, nor is for industrial purposes a sharp edge necessary. It is sufficient if the rectangular surfaces are united by rounded edges, or, more precisely, by a rounded corner between the two surfaces.

When employing my process for boxes or trunks, I can, for instance, produce a box or trunk resembling in appearance and shape the now usual and desired shape of a cane-trunk, which shape I have also shown in the accompanying drawings. This I attain by subjecting the veneers to the first pressing process in order to produce a straight three or more ply veneer board or plate, subsequently exposing the so obtained united (three or more ply) veneer board or plate to the action of superheated steam at a pressure of about three atmospheres. After the same has been previously softened or moistened at the place of bend I place the board or plate between two upright molds and so bend the same that the said board assumes or takes the U shape or form shown in Fig. 3 and marked with the letter *a*. In a similar manner the lid or cover can be produced from one straight plate and assumes the shape marked *b*, (also in Fig. 3,) said cover being of course produced from a shorter plate. The two ends of the box and the cover can be fitted from pieces of wood cut in the ordinary way or produced in any known manner, said sides or ends being subsequently connected with the bent plates *a* and *b* by nails, screws, angle-irons, glue, or in any other approved manner; yet these side or end pieces can, however, be produced in the same manner as the above-mentioned bodies—viz., by joining between preliminary molds three or more ply veneers to a plate, (for the said ends,) the edges of which plate may form an angle of approximately forty-five degrees. After these plates have been suitably fitted and cut the same could be moistened along the four edges exposed to the action of a steam-jet and the edges bent in molds to the rectangular shape required. These end pieces, or more precisely, the edges of the same, could then be connected to the body of the trunk in any approved manner either by glue, nails, screws, or the like.

The advantage of such articles produced by means of my improved process resides in the fact that an enormous resistability is produced by the crosswise position of the veneers, (or, more precisely, the cross direction of the grain of the one veneer board to the one immediately adjacent to it,) and, secondly, these articles produced by my improved process are extremely light in weight, and, furthermore, have a peculiar and increased strength. It is well known that veneers lying with their grain in a cross direction to each other have approximately the same resistability as a board of about six times the thickness, the further important advantage being present that such veneers (with their grain running in opposite directions) can neither contract nor shrink, swell or split.

Having thus fully described the nature of this invention, what I desire to secure by Letters Patent of the United States is—

1. The method of manufacturing shaped articles such as bowls, plates, boxes, trunks or the like from crosswise-arranged superposed veneers consisting in first uniting the latter with each other and at the same time preliminarily shaping them, then subjecting the surface of the preliminary-shaped articles to the action of steam, finally completing the shaping of the said articles by aid of pressure and heat, substantially as set forth.

2. The method of manufacturing shaped articles such as bowls, plates, boxes, trunks or the like from crosswise-arranged superposed veneers consisting in first uniting the latter with each other and at the same time subjecting the same to pressure, so as to obtain a preliminary shaping of the same, then subjecting the preliminary-shaped article to the action of steam to soften the same at its outside only, and finally subjecting said article to heat and at the same time pressing the said article the second time so as to thereby complete its shape, substantially as set forth.

In witness whereof I have hereunto set my hand in presence of two witnesses.

CARL WITTKOWSKY.

Witnesses:
 FRITZ SPERLING,
 C. H. DAY.